(12) United States Patent
Bleiner

(10) Patent No.: US 6,733,134 B2
(45) Date of Patent: May 11, 2004

(54) VISUAL SIGNALLING DEVICE ADAPTABLE TO A VEHICLE

(75) Inventor: Thomas Bleiner, Eze (FR)

(73) Assignee: Astron Group Technologies SA, Luxembourg (LU)

( * ) Notice: Subject to any disclaimer, the term of this patent is extended or adjusted under 35 U.S.C. 154(b) by 0 days.

(21) Appl. No.: 10/416,224
(22) PCT Filed: Oct. 26, 2001
(86) PCT No.: PCT/FR01/03324
§ 371 (c)(1),
(2), (4) Date: May 8, 2003
(87) PCT Pub. No.: WO02/38416
PCT Pub. Date: May 16, 2002

(65) Prior Publication Data
US 2004/0041983 A1 Mar. 4, 2004

(30) Foreign Application Priority Data
Nov. 9, 2000 (FR) .............................................. 00 14914

(51) Int. Cl.$^7$ .............................................. G03B 21/14
(52) U.S. Cl. ........................ 353/13; 340/904; 116/28 R
(58) Field of Search ............................... 353/11, 12, 13, 353/14; 340/345, 903, 904; 116/28 R, 47, 48, 37

(56) References Cited

U.S. PATENT DOCUMENTS

| | | | | |
|---|---|---|---|---|
| 3,949,362 A | * | 4/1976 | Doyle et al. ................. | 340/435 |
| 4,941,263 A | * | 7/1990 | Hirshberg ..................... | 33/264 |
| 5,281,985 A | * | 1/1994 | Chan ............................ | 353/13 |
| 5,495,243 A | | 2/1996 | McKenna | |
| 5,580,140 A | | 12/1996 | Katz et al. | |
| 5,617,085 A | | 4/1997 | Tsutsumi et al. | |
| 5,923,243 A | | 7/1999 | Bleiner | |

* cited by examiner

Primary Examiner—William C. Dowling
(74) Attorney, Agent, or Firm—Young & Thompson

(57) ABSTRACT

A visual singnalling device adaptable to a running vehicle (1), comprises a rear emitter (3) for emitting a laser beam (9) towards the rear of the vehicle (1). The rear emitter (3) comprises elements generating designs for projection, by the laser beam, of a singnaling design (11) at the rear of the vehicle. The invention applicable to equipment for motor vehicle, bus, boat.

19 Claims, 2 Drawing Sheets

Figure 1:
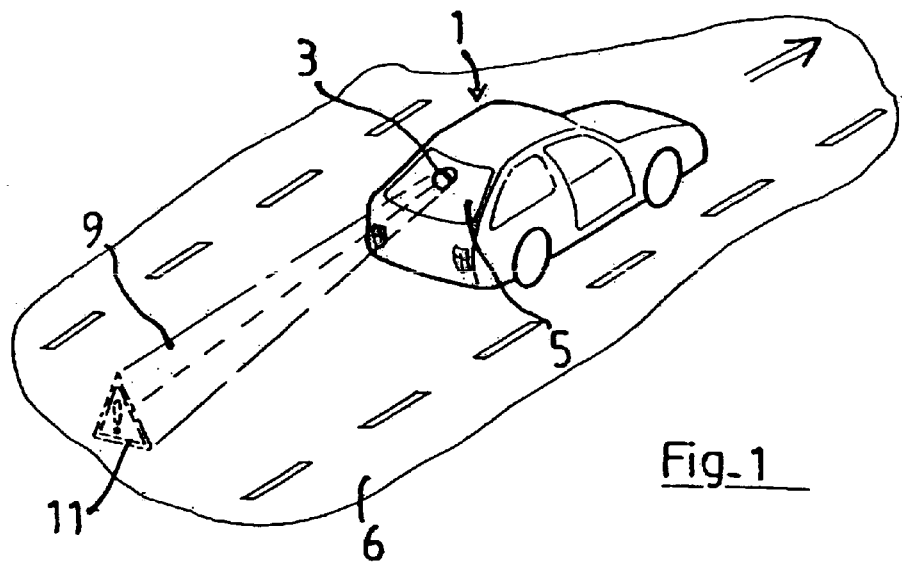

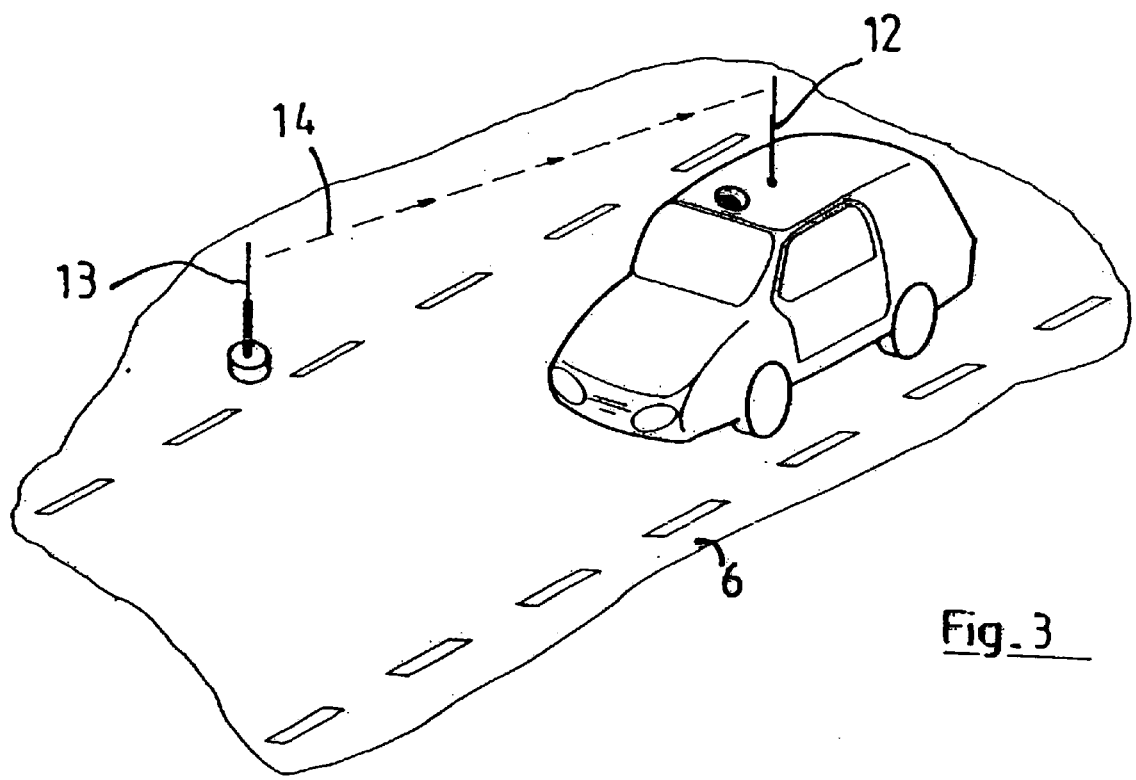
Fig_3
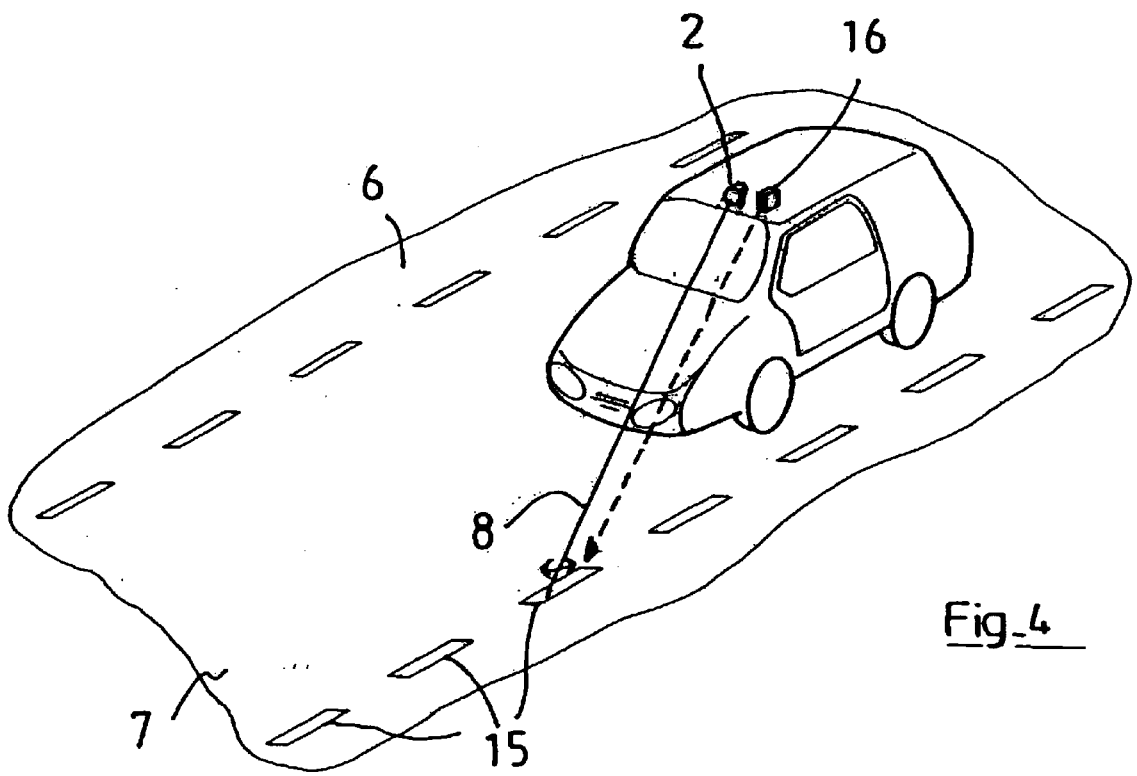
Fig_4

VISUAL SIGNALLING DEVICE ADAPTABLE TO A VEHICLE

The present invention relates to a device for visual signaling suitable for a moving vehicle.

It will find its application particularly in the field of automotive vehicle equipment for safety and signaling.

It is applicable to all moving vehicles such as buses, or else boats.

Automotive vehicles at present comprise more and more equipment to improve safety.

During foggy weather, in particular, it has already been proposed to offer to the following vehicle, from an equipped vehicle, information as to the distance separating the vehicle in front. For this purpose, there is known from WO-A-9520502 a device permitting a vehicle moving among other vehicles to transmit a signal to immediately following vehicles. This device uses a visible laser beam emitted from the device and directed in the direction opposite to the direction of movement of the equipped vehicle.

The laser beam is permanently directed such that the distance between the equipped vehicle and the point of impact of said beam on the roadway corresponds approximately to the safety distance that the immediately following vehicle should maintain. This device is particularly usable during intense rainfall or in foggy weather.

This device offers distance information useful to the following vehicle. However it does not give complete satisfaction.

In particular, such a device furnishes no explicit information to the following vehicle, particularly in the case of an accident, in the case of an emergency stopping simply to warn it of the use of a luminous point that can be seen on the roadway.

Moreover, this device is of interest only to the following vehicle and the vehicle with which it is equipped benefits from no information.

As a result, this device is of limited application and forms only very rudimentary information to a following vehicle.

It has also been proposed to supply information to a vehicle particularly as to the traffic on the road or as to possible accidents, from the dashboard of the vehicle thus equipped. Its driver could thus have access to various travel information or to data of the GPS type. However, such systems require substantial modification of the vehicle which can be made only at the time of construction of the vehicle. It is thus difficult to retrofit vehicles.

Moreover, such systems require display screens on the dashboard and onboard electronic devices that are relatively heavy and which increase the cost of such techniques.

The present invention permits overcoming the drawbacks of the techniques known at present.

To do this, it provides a new visible signaling device suitable for a vehicle, particularly an automotive vehicle, moving on a roadway.

This device has the advantage of offering to the following vehicle visual information particularly in rainy or foggy weather. To this end, the device emits a design which can be fixed or of a variable nature according to the type of information to communicate to the following vehicle.

As a result, the present device offers a wide range of application as to traffic information and permits warning the following vehicle for example of an accident, a fog bank to come, or else a malfunction in the vehicle which precedes it.

Another advantage of the device according to the invention is that it permits, according to a preferred modification, projecting forwardly of the vehicle thus equipped an informational design. This design could be identical to that projected rearwardly or be different particularly to give traffic information to the driver of the vehicle thus equipped.

The device according to the invention also has for its object to provide visible information predetermined by external control (for example provided by a roadway information transmission organism) or by detection of modification of the condition of the road or of the vehicle (for example detection of rainy weather, the triggering of an alarm of the vehicle, or of an airbag)

Another object of the invention is, according to a preferred embodiment, to assist the driver of the vehicle thus equipped in driving during foggy weather or rainy weather or generally speaking during poor visibility.

To do this, the device has the advantage of using marking strips on the ground in front of the vehicle and projecting onto them a laser beam which could sweep all the strip.

Other objects and advantages will become apparent from the description which follows, which gives the preferred embodiment of the invention but which is in no way thus limiting.

The present invention relates to a visual signaling device suitable for a moving vehicle, comprising a rear emitter for the emission of a laser beam to the rear of the vehicle, characterized by the fact that the rear emitter comprises means for generation of designs for projection by the laser beam of a signaling design to the rear of the vehicle.

This device could be present according to modifications introduced hereafter:

- it comprises control means for the activation of the rear emitter for its conditional operation.
- it comprises a front emitter for emitting a laser beam forwardly of the vehicle, said front emitter comprising means for generating designs for projection, by a laser beam, of a signaling design forwardly of the vehicle.
- it comprises control means for the activation of the front emitter for its conditional operation.
- the control means are connected to one or several detectors, for activation during detection of a change in condition of the vehicle or of meteorological conditions.
- the control means are connected to a receiver for an external control signal, for activation during reception of the external control signal.
- the means for generating designs are adapted to form a design from among several selected ones and the control means are adapted to address different controls to the emitter according to the nature of the design to be projected.
- it is on a moving vehicle on a street, and it comprises at least one camera seeing a region in front of the vehicle in which are located marking strips on the ground, that are either central or lateral in the normal position of movement of the vehicle, video processing means for computing the position of the marking strips on the ground relative to the vehicle, and means for rotating the front emitter with controlled motorization to position the point of impact of the laser beam toward the marking strips on the ground.
- the rotation means are actuated such that the point of impact of the beam sweeps the surface of the marking strip on the targeted ground.

The invention will be better understood from the attached drawings, which comprise:

FIG. 1 showing a first embodiment of the invention with projection of designs rearwardly of the vehicle.

Figure 2:
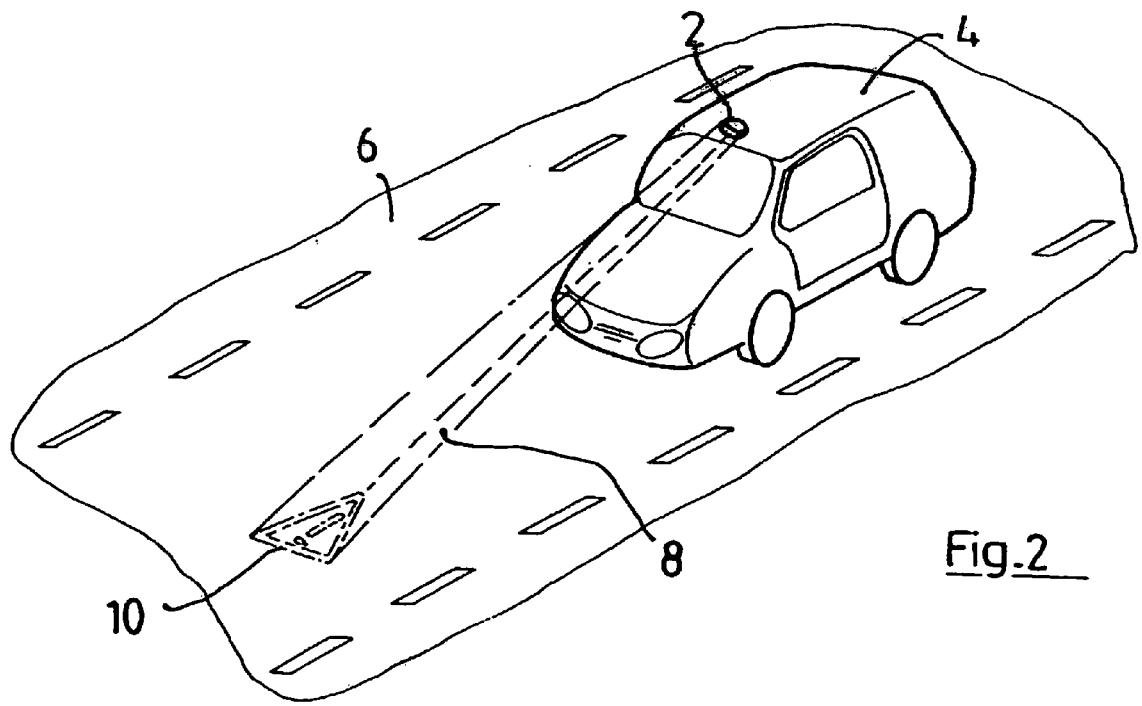

FIG. 2 which shows a projection of designs by laser beam forwardly of the vehicle.

FIG. 3 which shows a preferred embodiment of the invention in which the designs projected by the laser beam are controlled by an external control signal.

FIG. 4 which shows another modified embodiment of the invention in which a laser beam is projected forwardly of the vehicle and strikes the marking strips on the ground to guide driving by the user.

As described in WO-A-9520502, it is possible to provide an automotive vehicle with a laser emitter for the projection of a laser beam rearwardly of the vehicle.

According to this reference, the laser beam is of small dimension to provide an impact point on the roadway at a predetermined distance from the emitting vehicle. This apparatus however provides only information as to its impact on the roadway.

According to the invention, and as shown in FIG. 1, the signaling device comprises a rear emitter of current design adapted to emit a laser beam rearwardly of the vehicle.

Contrary to the present state of the art as in WO-A-9520502, the emitted beam permits the formation of a design corresponding to a predetermined visible signal rearwardly of the vehicle and in space.

To do this, the rear emitter 3 with which the vehicle 1 is provided, comprises means for generating designs.

Preferably, these design generation means are integrated into the emitter according to known techniques for the projection of designs with a laser emitter. Such apparatus is currently used in the field of luminous effect's for spectacles.

For safety reasons, there will preferably be used a low power laser emitter and for example of Class 2.

Preferably, the generated design is emitted rearwardly of the vehicle 1 and is not projected continuously. To this end, the device will preferably comprise control means for the actuation of the rear emitter 3 for its conditional operation.

Preferably, the device comprises similarly but for the front of the vehicle 1. A front emitter 2 for the emission of laser beam 8 forwardly of the vehicle 1.

Similarly, the front emitter 2 comprises means for generation of designs to produce a design 10 forwardly of the vehicle.

Again in a manner similar to the rear emitter 3, the front emitter 2 is coupled to control means which permit its actuation in a conditional manner.

By way of preferred example, this conditional operation is carried out by detection of a change of condition of the vehicle (for example by triggering the alarm, rotation of the contact key, release of an airbag). The operation can also be conditioned in a complementary or independent manner by changes in weather conditions. To this end, detectors will be positioned on the vehicle to detect strong rainfall or else foggy weather.

It is also possible to control the activation of the front emitter 2 and of the rear emitter 3 by an external control signal 14 as shown in FIG. 3. There, the vehicle 1 is provided with reception means for a control signal 14. These means include particularly an antenna 12 and an onboard receiver in the vehicle.

Preferably, the control signal 14 is a Hertzian signal particularly by satellite transmission emitted from a traffic information service center and transmitted to the vehicle 1 by transmission terminals 13 positioned along the edge of the road.

It will be seen that it is possible to actuate the emission of a laser beam 9 to the rear of the vehicle, and if desired a laser beam 8 to the front of the vehicle 1, under multiple conditions of actuation.

It is also possible to vary the identity of the design 11, 10 to be projected, according to the nature of the control.

By way of example, a detector detecting strong rainfall could generate a design rearwardly of the vehicle constituted by a danger warning panel such as shown in FIGS. 1 and 2.

Again by way of example, the triggering of a detector connected to the alarm of the vehicle 1 could generate a design to the rear and if desired to the front of the vehicle 1, constituting information signaling that the vehicle is stolen.

Again by way of example, the triggering of the airbags could disclose that the vehicle has undergone an accident and a design 10, 11 corresponding to information as to the driver and the passengers could be supplied (identity of the persons, blood group, . . .).

Referring to FIG. 4, it will be seen that the device according to the invention can be provided with a camera 16 coupled with video processing means (not shown).

As shown, the camera 16 is oriented forwardly of the vehicle 1 to target a zone on the roadway 6 corresponding to the zone in which the marking strips on the ground 15 are conventionally found in the normal driving position.

It could be a matter of marking strips on the center of the ground or to the side.

With the camera 16 and video processing means, there is calculated within the vehicle 1 the position of the marking strips. 15 on the ground relative to the vehicle 1.

Consequently, the laser beam 8 is oriented such that it will strike the roadway 6 at the marking strips 15 on the ground. The selective orientation of the emitter 2 could, be operated by controlled motorization rotation means. It could be a matter of an electric motor which could control the rotation of the emitter about a vertical axis, and if desired about a horizontal axis if it is desired to modify the distance of impact of the front laser beam 8 relative to the vehicle 1.

Preferably, the motorization is controlled such that the beam 8 (which is thus of small width) sweeps the surface of the targeted marking strip, and this laterally and possibly longitudinally.

A laser emitter 2 of the color white will be preferred in this application.

It is to be noted that, by association of the vehicle thus equipped of the present device with an assembly of transmission terminals 13 connected by radio to a traffic information transmission center, there is formed a unitary system for transmission of information to a large number of vehicles.

It will also be noted that the device according to the invention can be on a vehicle already on the market without it being necessary that it be provided to be incorporated at the time of construction of the vehicle.

For reasons of simplicity, the figures refer to an emitter 2 and a camera on the roof 4 of the vehicle.

In practice, the emitter 2 will ordinarily be located lower down, for example at the level of the grille of the radiator.

Similarly, the camera or cameras will be integrated into the optical blocks of headlights (on one side of the vehicle or on both sides, according to the desired manner of embodiment).

REFERENCES

1. Vehicle
2. Front emitter
3. Rear emitter
4. Roof
5. Rear lens
6. Pavement
7. Roadway 8. Front laser beam
9. Rear laser beam
10. Front design
11. Rear design
12. Antenna
13. Transmission terminal
14. Control signal
15. Ground marking
16. Camera

What is claimed is:

1. Vehicle (1) provided with a device for visual signaling under conditions of poor visibility, said device comprising an emitter (3) directed to the rear for the emission of a laser beam (9) rearwardly of the vehicle (1), characterized by the fact that the rear emitter (3) comprises means for generating designs for projection, by the laser beam, of signaling designs (11) to the rear of the vehicle.

2. Vehicle according to claim 1, characterized by the fact that the visual signaling device comprises control means for the actuation of the rear emitter (3) for its conditional operation.

3. Vehicle according to claim 1, characterized by the fact that the visual signaling device comprises a front emitter (2) for emitting a laser beam (8) forwardly of the vehicle (1), said front emitter (2) comprises means for generating designs for the projection, by the laser beam, of signaling designs forwardly of the vehicle.

4. Vehicle according to claim 3, characterized by the fact that the visual signaling device comprises control means for the actuation of the front emitter (2) for its conditional operation.

5. Vehicle according to claim 2, characterized by the fact that the control means are connected to one or several detectors, for actuation upon detection of a change of condition of the vehicle or of weather conditions.

6. Vehicle according to claim 2, characterized by the fact that the control means are connected to a receiver (14) of an external control signal, for actuation upon reception of the external control signal.

7. Vehicle according to claim 2, characterized by the fact that the means for generating designs are adapted to form a design from among several choices and that the control means are adapted to address different controls to the emitter according to the nature of the design to be projected.

8. Vehicle according to claim 3, characterized by the fact that the visual signaling device comprises:

at least one camera (16) observing a region to the front of the vehicle (1) in which are located marking strips (15) on the ground either centrally or laterally in the normal position of driving of the vehicle, video processing means for computing the position of the marking strips (15) on the ground relative to the vehicle (1)

motorized means for rotating the front emitter (2) controlled to position the impact point of the laser beam toward the marking strips (15) on the ground.

9. Vehicle according to claim 8, characterized by the fact that the rotation means are actuated such that the point of impact of the beam sweeps the surface of the targeted marking strip (15) on the ground.

10. Method for visual signaling rearwardly of a vehicle moving under conditions of poor visibility, comprising the steps of:

providing a vehicle with a device comprising an emitter directed for emission of a laser beam rearwardly of the vehicle, the emitter comprising means for generating designs for projection, by the laser beam, of signaling designs to the rear of the vehicle; and activating the emitter to project the signaling designs.

11. Vehicle according to claim 2, characterized by the fact that the visual signaling device comprises a front emitter (2) for emitting a laser beam (8) forwardly of the vehicle (1), said front emitter (2) comprises means for generating designs for the projection, by the laser beam, of signaling designs forwardly of the vehicle.

12. Vehicle according to claim 11 characterized by the fact that the visual signaling device comprises control means for the actuation of the front emitter (2) for its conditional operation.

13. Vehicle according to claim 4, characterized by the fact that the control means are connected to one or several detectors, for actuation upon detection of a change of condition of the vehicle or of weather conditions.

14. Vehicle according to claim 4, characterized by the fact that the control means are connected to a receiver (14) of an external control signal, for actuation upon reception of the external control signal.

15. Vehicle according to claim 5, characterized by the fact that the control means are connected to a receiver (14) of an external control signal, for actuation upon reception of the external control signal.

16. Vehicle according to claim 4, characterized by the fact that the means for generating designs are adapted to form a design from among several choices and that the control means are adapted to address different controls to the emitter according to the nature of the design to be projected.

17. Vehicle according to claim 5, characterized by the fact that the means for generating designs are adapted to form a design from among several choices and that the control means are adapted to address different controls to the emitter according to the nature of the design to be projected.

18. Vehicle according to claim 6, characterized by the fact that the means for generating designs are adapted to form a design from among several choices and that the control means are adapted to address different controls to the emitter according to the nature of the design to be projected.

19. Vehicle according to claim 11, characterized by the fact that the visual signaling device comprises:

at least one camera (16) observing a region to the front of the vehicle (1) in which are located marking strips (15) on the ground either centrally or laterally in the normal position of driving of the vehicle, video processing means for computing the position of the marking strips (15) on the ground relative to the vehicle (1)

motorized means for rotating the front emitter (2) contrtolled to position the impact point of the laser beam toward the marking strips (15) on the ground.

* * * * *